United States Patent
Tipton

(10) Patent No.: US 9,205,377 B2
(45) Date of Patent: Dec. 8, 2015

(54) SCR SYSTEM FOR PURIFYING EXHAUST GASES IN NOX

(75) Inventor: Larry Tipton, Sterling Heights, MI (US)

(73) Assignee: INERGY AUTOMOTIVE SYSTEMS RESEARCH (Société Anonyme), Brussels (BE)

( * ) Notice: Subject to any disclaimer, the term of this patent is extended or adjusted under 35 U.S.C. 154(b) by 717 days.

(21) Appl. No.: 12/933,627

(22) PCT Filed: Mar. 25, 2009

(86) PCT No.: PCT/EP2009/053475
§ 371 (c)(1),
(2), (4) Date: Sep. 20, 2010

(87) PCT Pub. No.: WO2009/118325
PCT Pub. Date: Oct. 1, 2009

(65) Prior Publication Data
US 2011/0016853 A1    Jan. 27, 2011

Related U.S. Application Data

(60) Provisional application No. 61/040,215, filed on Mar. 28, 2008.

(30) Foreign Application Priority Data

May 7, 2008  (EP) .................................... 08155793

(51) Int. Cl.
*F01N 3/00* (2006.01)
*B01D 53/94* (2006.01)
*F01N 3/20* (2006.01)

(52) U.S. Cl.
CPC .......... *B01D 53/9409* (2013.01); *F01N 3/2066* (2013.01); *B01D 2251/2067* (2013.01);
(Continued)

(58) Field of Classification Search
CPC .................. B01D 53/9409; B01D 2251/2067; B01D 2258/012; F01N 3/2066; F01N 2610/12; F01N 2610/14; F01N 2610/1426; F01N 2610/1473; F01N 2610/1493
USPC .......................................................... 60/286
See application file for complete search history.

(56) References Cited

U.S. PATENT DOCUMENTS 5,511,957 A * 4/1996 Tuckey et al. ................. 417/313
5,884,475 A * 3/1999 Hofmann et al. ............... 60/274
(Continued)

FOREIGN PATENT DOCUMENTS

EP   1 830 040 A1   9/2007
JP   8-323116       12/1996
(Continued)

OTHER PUBLICATIONS

English translation of Japanese Patent Application Publication No. JP 2007162624 A.*
(Continued)

*Primary Examiner* — Jason Shanske
(74) *Attorney, Agent, or Firm* — Oblon, McClelland, Maier & Neustadt, L.L.P.

(57) ABSTRACT

SCR system comprising a tank for storing an additive, an injector, a pump for conveying the additive from the tank to the injector via an injection line, a primary filter located on the injection line between the tank and the pump and a secondary filter also located on the injection line but between the pump and the injector, said system further comprising a particle trap located between both filters.

11 Claims, 2 Drawing Sheets

(52) U.S. Cl.
CPC ....... *B01D2258/012* (2013.01); *F01N 2610/02* (2013.01); *F01N 2610/10* (2013.01); *F01N 2610/14* (2013.01); *F01N 2610/1426* (2013.01); *F01N 2610/1473* (2013.01); *F01N 2610/1493* (2013.01); *Y02T 10/24* (2013.01)

(56) References Cited

U.S. PATENT DOCUMENTS

| | | | |
|---|---|---|---|
| 5,976,475 | A | 11/1999 | Peter-Hoblyn et al. |
| 6,125,826 | A | 10/2000 | Brocard et al. |
| 7,156,027 | B1 * | 1/2007 | Yokoyama et al. ........... 110/341 |
| 2003/0168402 | A1 * | 9/2003 | McKay ..................... 210/512.1 |
| 2004/0057852 | A1 * | 3/2004 | Evans ........................ 417/423.9 |
| 2005/0178861 | A1 | 8/2005 | Sugiyama |
| 2007/0068143 | A1 * | 3/2007 | MacBain et al. ................ 60/286 |
| 2009/0078692 | A1 | 3/2009 | Starck |
| 2009/0205316 | A1 | 8/2009 | Dougnier et al. |

FOREIGN PATENT DOCUMENTS

| | | |
|---|---|---|
| JP | 2005-226557 | 8/2005 |
| JP | 2005-226557 A | 8/2005 |
| JP | 2006-177317 | 7/2006 |
| JP | 2006-177317 A | 7/2006 |
| JP | 2007-162624 | 6/2007 |
| JP | 2007-162624 A | 6/2007 |
| JP | 2007162624 A * | 6/2007 |
| JP | 2007-321647 | 12/2007 |
| JP | 2007-321647 A | 12/2007 |
| WO | WO 2006064028 A1 | 6/2006 |
| WO | WO 2007017080 A1 | 2/2007 |
| WO | WO 2007141312 A1 | 12/2007 |
| WO | WO 2008006840 A1 | 1/2008 |

OTHER PUBLICATIONS

Office Action issued Jan. 28, 2014, in Japanese Patent Application No. 2011-501206 (with English language translation).

* cited by examiner

SCR SYSTEM FOR PURIFYING EXHAUST GASES IN NOX

CROSS-REFERENCE TO RELATED APPLICATIONS

This application is a U.S. national stage application under 35 U.S.C. §371 of International Application No. PCT/EP2009/053475 filed Mar. 25, 2009, which claims priority to U.S. Provisional Application 61/040,215 filed Mar. 28, 2008 and to European Patent Application No. 08155793.6 filed May 7, 2008, these applications being incorporated herein by reference in their entirety for all purposes.

TECHNICAL FIELD OF THE INVENTION

The present invention relates to an SCR system for purifying exhaust gases in NOx.

BACKGROUND OF THE INVENTION

With the current evolution in the standards on exhaust emissions from vehicles, devices for pollution control of NOx (or nitrogen oxides) have had to be put in place, especially on trucks (heavy goods vehicles).

The system used by most vehicle manufacturers for reducing NOx emissions to the required value generally consists in carrying out a selective catalytic reaction with reducing agents such as urea ("Urea SCR" or selective catalytic reduction using ammonia generated in situ in the exhaust gases by decomposition of urea).

In order to do this, it was necessary to equip the vehicles with a tank containing a urea solution, a device for metering the amount of urea to be injected into the exhaust line and a device for supplying the urea solution from the tank to the injector. Generally, this supply device comprises a pump.

As it is the case with other fluid injection systems on vehicles, like fuel injection for instance, it is preferable to protect the pump against particles that may be contained in the additive leaving the tank, and to protect the metering device (if metering is not performed directly by the pump and/or injector) and the injector from contamination by wear particles produced by the pump.

The first problem is classically solved by putting a filter in between the tank and the pump. As to the second one, U.S. Pat. No. 6,125,826 proposes to solve it in the case of a fuel injection system, by inserting a self-washing filter of given geometry between the pump and the metering device. This filter provides a filtered fuel flow to a metering device and a particle containing fuel flow which is returned through a bypass valve to a position upstream of the main filter. Such a system only works with injection systems involving a return line and where the fluid to be injected always circulates in the same direction.

However, the aqueous urea solutions generally used in SCR (eutectic water/urea solutions with 32.5% by weight of urea) freeze at −11° C. so it is necessary to provide not only a heating device (to liquefy the solution in order to be able to inject in freezing conditions) but also: a purge system in order to be able to periodically purge the lines that convey the urea in order to clear them of the liquid deposits of additives, which are liable to solidify in case of frost.

An effective way to perform such a purge is described in patent application WO 2006/064028 in the name of the Applicant. It uses a purge device suitable for forcing a purge gas to flow through the entire injection line from the injector to the tank, which consists in:
either a compressed air tank and a purge line equipped with a valve for passing the compressed air through the said line;
or a switch for reversing the flow of the pump (6);
or a 4/2-way valve (14) which, using suitable fittings/lines, produces the same effect.

The two last alternatives are preferred because they do not involve an additional compressed gas tank. The purge gas of these embodiments consists in fact of engine exhaust gas and/or ambient air which is sucked into the injection line by a suitable device, via the exhaust line. If the pump can operate in two opposing directions and generate reverse flows, this device may be a simple switch that has the effect of reversing the flow of the pump. With standard pumps, the purge device may be a 4/2-way valve, which, in normal mode (additive injection) connects a point downstream of the pump to the injector, and in purge mode, connects the injector to a point upstream of the pump—which has somewhat the same effect as reversing the flow of the pump (the upstream and downstream points being reversed by the valve).

When the system of WO'028 is working in purge mode, particles that were trapped on the secondary filter (i.e., the one that is generally present on the injector (integrated to it) and/or the additional one as described in U.S. Pat. No. '826 mentioned above) are pulled back into the pump and trapped on the primary filter. Then, when the pump is put in feed mode again, these particles are pulled back into the pump again until they reach the secondary filter etc . . . causing additional wear and damage to the pump.

SUMMARY OF THE INVENTION

The present invention aims at solving that problem by providing an SCR system able to be purged completely (from the injector to the tank) by a gas (for instance the exhaust gases and/or air) and this without cycling particles through the pump respectively in feed and purge mode, said system being effective both with systems implying a return of additive and with returnless systems.

According to the invention, that problem is solved by putting a particle trap somewhere in between the primary filter and the secondary one.

Hence, the present invention concerns an SCR system comprising a tank for storing an additive, an injector, a pump for conveying the additive from the tank to the injector via an injection line, a primary filter located on the injection line between the tank and the pump and a secondary filter also located on the injection line but between the pump and the injector, said system further comprising a particle trap located between both filters.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 1:
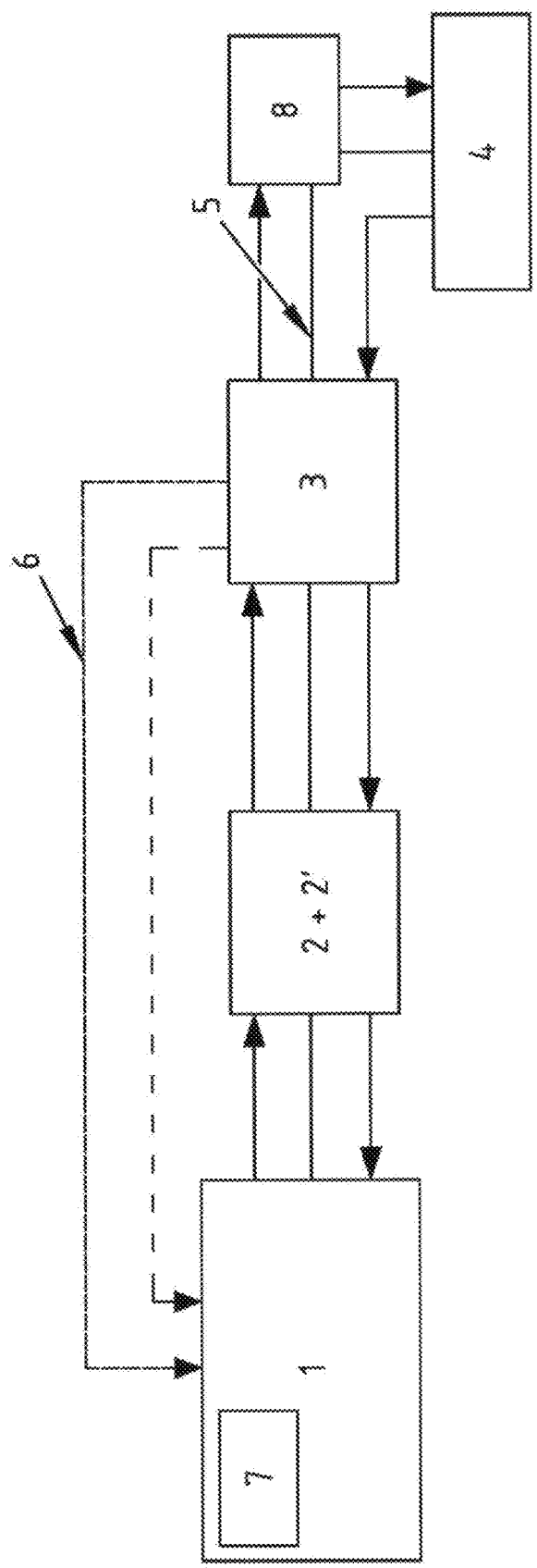
FIG. 1 shows schematically an SCR system according to a preferred embodiment of the present invention.

As explained above, the role of the particle trap is to trap wear particles and also, built-in debris particles that would otherwise cycle through the pump during its life-time of feed and purge modes.

The additive concerned in the context of the invention is a reducing agent suitable for reducing the NOx present in the exhaust gases of internal combustion engines. It is advantageously ammonia used directly (which has the associated drawbacks of safety and corrosion), or generated in situ in the exhaust gases using a precursor such as urea (thereby avoiding the above drawbacks). The invention yields good results with urea and, in particular, with aqueous solutions of urea. Eutectic aqueous solutions (comprising 32.5% by weight of urea) are suitable.

The present invention can be applied to any internal combustion engine liable to generate NOx in its exhaust gases. It may be an engine with or without a fuel return line (that is, a line returning the surplus fuel not consumed by the engine to the fuel tank). It is advantageously applied to diesel engines and, in particular, to vehicle diesel engines and, in a particularly preferred manner, to diesel engines of trucks.

The system according to the invention comprises at least one tank for storing the additive and at least one injection line for conveying the additive to an exhaust pipe of the engine. This line is equipped at its end with an injector for injecting the additive into the exhaust gases.

The system according to the invention further comprises a pump for conveying the additive from the additive tank to the injector. This pump may be located inside the additive tank (with the advantage of forming a compact and built-in module with it) or, given the corrosive environment, may be located outside the additive tank. Its constituent materials are preferably selected from corrosion resistant metals (certain grades of stainless steel and anodized aluminium in particular). The use of copper, even for connection elements, is undesirable.

This pump is generally driven by an electric motor (which is preferably specific to it, i.e., which is only used to drive the pump and exercises no other function). Preferably the pump is a gear pump. It generally comprises a stator and a rotor. It is preferably able to operate in two opposite rotational directions, one generally corresponding to supplying the injection line with liquid and the other generally corresponding to a purge of the injection line.

The injector of the system according to the invention may either be a so-called "active" injector (that is to say that includes the metering function), or it may be a "passive" injector which merely injects (vaporizes) a quantity of additive metered by another device (like a dosing valve of the pump itself linked to a pressure regulator).

Usually, the system according to the invention comprises a control unit connected to the injector and/or to the metering device and allowing the required amount of additive to be injected into the exhaust gases (the amount being dependent in particular on the following parameters: emission level and degree of conversion of the NOx; temperature and pressure; engine speed and load, etc. and, optionally, the quality (state of ageing) of the solution).

In certain cases, the entire additive flow provided by the pump is not injected into the exhaust gases and the uninjected part must then be recirculated. Such an excess flow may be used to cool certain types of "active" injectors (such as that described in U.S. Pat. No. 5,976,475 for example). It may also be necessary for accurate metering control as in the system described in Application FR 06/06425 in the name of the Applicant and which involves the use of a metering valve and a pressure regulator coupled to a passive injector.

The system of the invention comprises a primary filter located upstream of the pump in order to protect said pump from particles which might be contained in the additive leaving the tank and which are likely to damage or clog it. Any type of filter may be used as primary filter. Preferably, said filter comprises a filter media which may be flat, cylindrical and which may be of paper, plastic fibers. Preferably, it is a depth media (i.e., a staged arrangement of fibrous material having a given density/porosity) and even more preferably, a gradient density depth media (i.e., depth media of increasing density i.e., decreasing density). A high capacity gradient density depth media type can enhance the ability of the filter element to retain the contaminants in either the forward or purge modes, and is therefore preferred. Such filter media are available under the brand StrataPore™ HCGD from Kuss. The conventional laminated paper or woven elements of the preferred micron range can be used but they have less intrinsic ability to retain contaminants like a depth media.

The primary filter is located "between" the tank and the pump, which is—in the frame of the invention—meant to include the cases where said filter is integrated either to the tank or to the pump. In fact, as described in patent application WO 2007/141312 in the name of the Applicant, said filter and pump may advantageously be integrated in a flange which is immerged in the additive tank. In that case, part of the injection line is also integrated in said flange.

The system of the invention also comprises a secondary filter located upstream of the injector ("between" the pump and the injector in fact, with the same meaning as above) in order to protect said injector from particles that might have been generated by the part of the injection line located between the primary filter and the injector, including the pump. These might be wear particles or built-in debris particles which came loose when the pump is first primed.

Most of the commercial injectors include in fact a built-in filter or strainer which may act as the secondary filter of the system according to the invention.

The key element of the system according to the invention is the presence of a particle trap "between" (always with the same meaning) the primary and the secondary filter. The particle trap of the invention is preferably a device having (at least in one part of it) an appropriate geometry so as to trap particles i.e., to separate them from the liquid additive flowing through it and to prevent them from being pulled back into the liquid flow for instance if said flow is reversed. Preferably, the particle trap is able to trap particles having a diameter of 100 μm or more, even more preferably, of 70 μm or more, even 40 μm or more (because generally, injector strainers meet that specification so that if particles larger than this are trapped, the injector strainer will never be blocked).

A geometry/shape which gives good results in trapping particles consists in a tortuous path which causes particles to fall out of the flow path while the liquid is still able to flow through said path. According to that embodiment, the particles are trapped in a feature or profile that will not allow them to re-enter the flow path when the normal suction flow is resumed. Hence, such traps are only effective in trapping particles in one flow direction.

Since as explained above, the problem the invention aims to solve is related to particles which are cycling in the pump i.e., which are pulled back from the secondary filter in purge mode, it is preferred that said trap is initiated in purge mode i.e., trapping the particles which are effectively pulled back from the secondary filter.

In order to reduce the number of parts to be assembled, the particle trap is preferably integrated to another part of the system. Since the secondary filter is generally part of commercial injectors, the easiest way to perform part integration is to integrate the particle trap to the primary filter (i.e., to mount the particle filter inside or onto the filter, or even: molding it at least partially with a part of the filter—like its cartridge for instance). Besides, since this primary filter is generally provided with a heating element to thaw it in case of frost, integrating the particle trap to the filter will allow said trap to be thawed as well without the recourse to an additional heating element. And finally, since the filter generally has the option of being replaced as a service item, contaminants trapped inside the particle trap could be removed at the same time.

As explained above, the system of the invention is particularly effective for SCR systems in which a gas (like exhaust gases and/or air) passes through the injector in purge mode so that the entire injection line can be purged. According to the invention, "entire injection line" means not only the actual line but also any element/device that is located thereon and is traversed by the injection flow, like the pump for instance.

In the case where there is an additive return line, it is advantageous in the context of the invention for it to be purged as well.

The system according to the invention preferably comprises a device suitable for purging it, which is advantageously:
- either a switch for reversing the flow of the pump;
- or a 4/2-way valve which, using suitable fittings/lines, produces the same effect.

As regards the starting of the system in case of frost, it may obviously happen that the tank itself is frozen. To correct this situation, according to an advantageous variant, the system according to the invention comprises a device capable of thawing at least part of the additive tank if necessary and, preferably, as rapidly as possible after starting the engine. Such a device may be a heater (of the resistor type for instance), a bypass of the engine cooling circuit, or a bypass of the hot fuel return (in the case of direct injection engines). Preferably, it is a heater integrated to an immerged flange as described above and even more preferably: to a liquid reservoir integrated to said flange (which traps a small amount of liquid and in which the pump actually sucks the additive).

Figure 2:
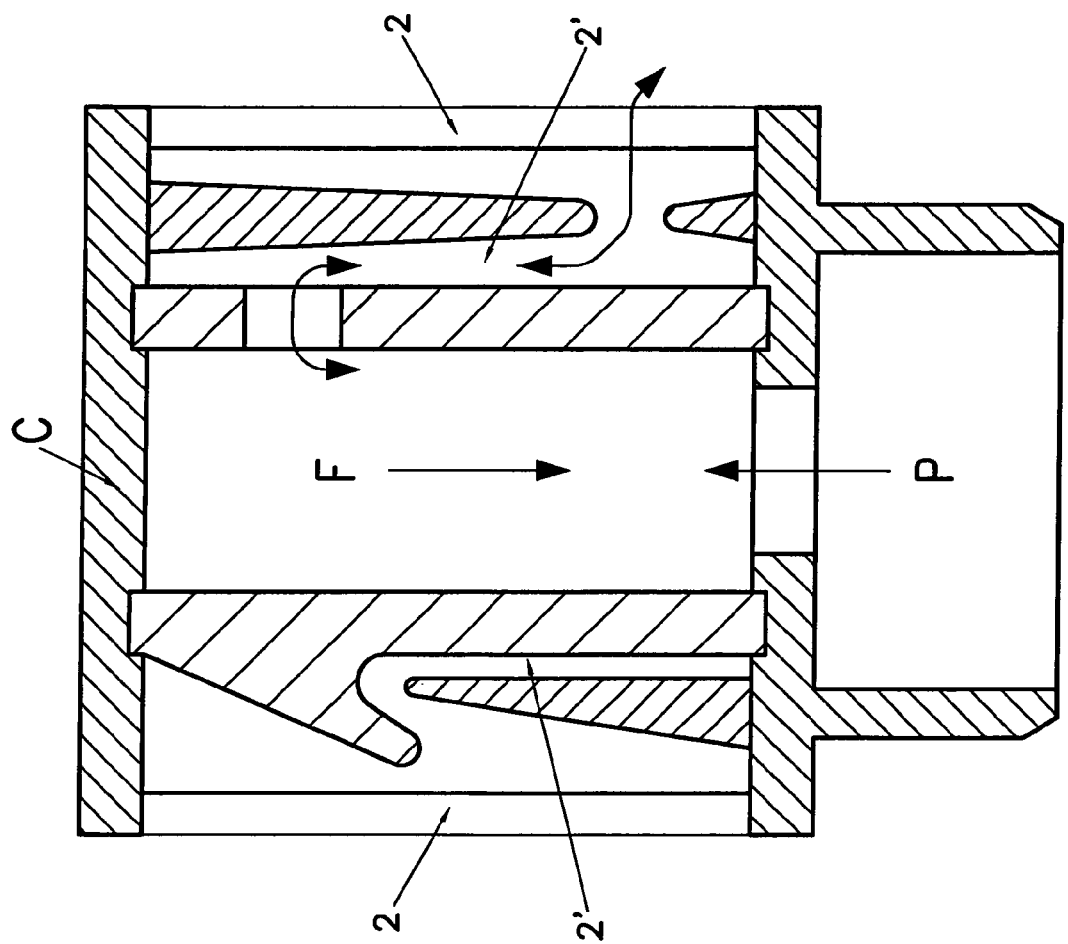
FIG. 2 illustrates a detailed view of a part of the SCR system of FIG. 1.

The present invention is illustrated in a non-limiting manner by FIGS. 1 & 2. FIG. 1 shows schematically an SCR system according to a preferred embodiment of the present invention and FIG. 2, a detailed view of a part of said system.

The SCR system depicted in FIG. 1 comprises a urea tank (1) from which urea can be fed to an injector (4) through an injection line (5), using a pump (3) and an integrated primary filter (2)/particle trap (2') unit. The urea tank (1) includes a heater (7). The feed and the purge directions are respectively indicated by the upper and lower arrows parallel to the injection line (5). FIG. 1 also illustrates a secondary filter (8) provided between the pump (3) and the injector (4).

Such an SCR system may comprise a return line (6) as optional component (dotted line), of which again the feed and purge directions (which are the same) are pictured by arrows parallel to said line (6).

Part of the integrated filter/trap unit (2+2') is shown in more details in FIG. 2.

This unit comprises a cylindrical filter media (2) which is inserted in a casing (C) of which only a part is illustrated (namely the molded end-caps, the cylindrical outer shell not being shown). The filter casing (C) incorporates at least part of the particle trap (2') which is in fact a tortuous path delimitated by features molded in with the end caps of the casing (C). In this figure, two different geometries for said particles trap (2') (one on the left and the other on the right) are given by way of example.

The urea enters filter media (2) circumferentially (from the outside to the inside of the cylinder) in feed mode and leaves it centrally (which is indicated by the arrow F). In purge mode, it is exactly the opposite: the urea enters centrally as shown by the arrow P, and flows out circumferentially through the cylindrical filter media (2).

This filter media (2) is such that only particles smaller than 20 µm may pass through the media in either direction. So, when the purge mode is activated, larger particles remain on the interior surface of the media (2) which makes them available to pass back through the pump (2) when the forward flow returns. The particle trap (2') prevents that by causing the particles to fall out and be trapped away from the flow path (indicated by arrows).

The invention claimed is:

1. A selective catalytic reduction (SCR) system comprising:
    a tank for storing an additive,
    an injector,
    a pump for conveying the additive from the tank to the injector via an injection line,
    a primary filter located on the injection line between the tank and the pump,
    a secondary filter also located on the injection line but between the pump and the injector,
    a particle trap located between both filters, said particle trap configured to trap particles so as to separate the particles from the additive flowing through the particle trap and to prevent said trapped particles from being pulled back into the flow when said flow is reversed, and
    a casing that contains the particle trap,
    wherein the particle trap is a device having, at least in one part, a tortuous path which causes the particles to fall out of the flow while the liquid is still able to flow through said path, and
    wherein features which delimit the tortuous path are molded into endcaps of the casing.

2. The SCR system according to claim 1, wherein the pump is a gear pump which is able to operate in two opposite rotational directions.

3. The SCR system according to claim 1, wherein the secondary filter is a strainer which is integrated to the injector.

4. The SCR system according to claim 1, wherein the particle trap only traps the particles which are pulled back from the secondary filter when the flow of additive is reversed such that the additive flows from the injector to the tank.

5. The SCR system according to claim 1, wherein the particle trap is integrated to the primary filter.

6. The SCR system according to claim 1, further comprising:
    a device suitable for purging said SCR system, said device being either a switch for reversing the flow of the pump or a 4/2-way valve which, using suitable fittings or lines, produces a same effect.

7. The SCR system according to claim 6, further omprising:
    an additive return line which can be purged.

8. The SCR system according to claim 1, further comprising:
    a device configured to thaw at least part of the additive tank in case of frost.

9. The SCR system according to claim 8, wherein a heater is integrated to a liquid reservoir which is part of a flange immerged into the additive tank.

10. The SCR system according to claim 1, wherein the particle trap is configured to trap wear particles and built-in debris particles that would otherwise cycle through the pump during a life-time of feed and purge modes of the pump.

11. The SCR system according to claim 1, wherein in a feed mode of the pump the fuel enters the tortuous path circumferentially and exits the casing by a central opening and in a purge mode of the pump the fuel enters the casing by the central opening and exits the tortuous path circumferentially.

* * * * *